Nov. 9, 1965  R. G. MARKISEN  3,216,750
CONNECTOR
Filed July 17, 1963  2 Sheets-Sheet 1
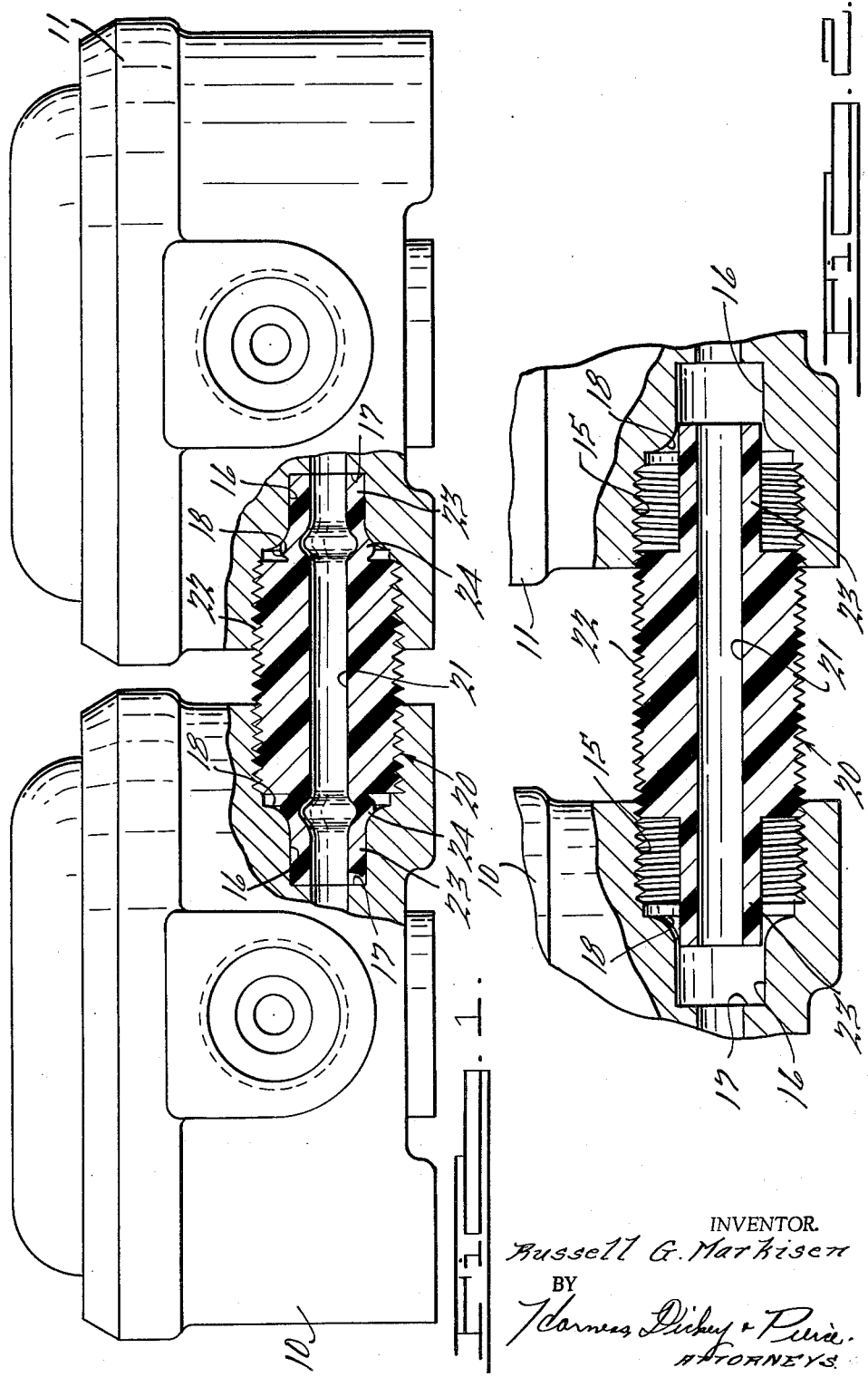
INVENTOR.
Russell G. Markisen
BY
Harness, Dickey & Pierce
ATTORNEYS

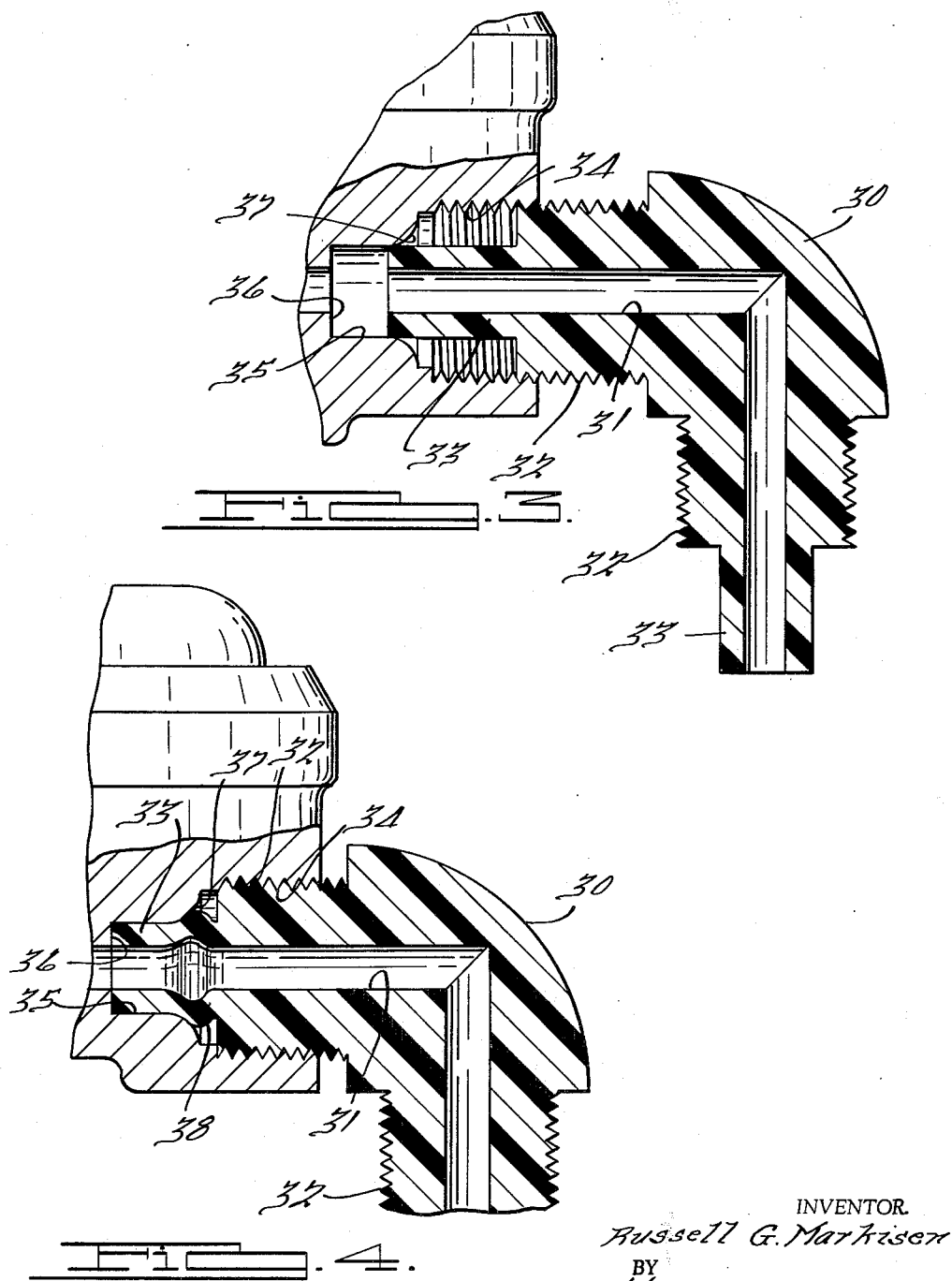

United States Patent Office 3,216,750
Patented Nov. 9, 1965

3,216,750
CONNECTOR
Russell G. Markisen, Racine, Wis., assignor to Walker Manufacturing Company, Racine, Wis., a corporation of Delaware
Filed July 17, 1963, Ser. No. 295,752
8 Claims. (Cl. 285—179)

This invention relates to connectors and more particularly to devices of this type adapted for connecting pumps and meters, meters to manifolds, and in any other environment where it is desired to directly connect two parts by a fluid passage connector.

One of the objects of this invention is to provide a device of this character which is of a simple one-piece construction which may be readily and economically manufactured of molded plastic, and which may be quickly and easily installed inasmuch as it involves the handling of only a single part.

Another object is to provide a fluid passage connector so constructed that the connected parts may be readily indexed with respect to one another.

Another important object of the invention is to provide a device of this type in which a portion of the connector is upset during the installation operation to expand the same into engagement with a mating part on the member being connected to thereby form a positive liquid seal at either or both ends of the connector.

To this end the connector comprises a tubular member having a threaded portion intermediate its ends and reduced end portions. The tubular member constituting the connector is made of plastic material so that it may be readily manufactured by molding. Also its end portions may be deformed and thereby upset or expanded under axial pressure. The part to be connected has a threaded portion and a bore with an abrupt shoulder adjacent one end and a curved or rounded shoulder adjacent the other end. The connector is threaded into said threaded portion until the reduced end portion abuts said abrupt shoulder thereby restricting further axial movement of the connector end. Thereafter, continued axial pressure on said connector by the threaded connection with said part to be connected causes said reduced end to be upset and expand radially outwardly into sealing engagement with said curved or rounded shoulder thus providing a positive seal between said connector and part.

The aforesaid reduced end portions may be provided on both ends of the connector with the described mating parts on two members to be connected whereby positive seals may be simultaneously and independently formed at both ends of the connector.

The heretofore described structure may be embodied in, and the advantages obtained, elbows, Ts, and the like. In fact, the invention employed in connection with an elbow is shown as a modification of the invention.

The various objects and advantages, and the novel details of construction of two commercially practical embodiments of the invention, will become more apparent as this description proceeds, especially when considered in connection with the accompanying drawings, in which:

FIGURE 1 is a sectional, elevational view of two liquid measuring meters operatively connected together by a connector constructed in accordance with this invention;

FIGURE 2 is a fragmentary view showing the connector in an initial position prior to completing the connection;

FIGURE 3 is a fragmentary view similar to FIGURE 2 but showing the invention incorporated in an elbow; and FIGURE 4 is a view of the connector shown in FIGURE 3 in fully connected position.

While the connector forming the subject matter of this invention may be used in various ways, as, for instance, for connecting pumps and meters and meters to manifolds, the environment in which it is illustrated involves connecting a liquid measuring meter 10 to a liquid measuring meter 11.

In the embodiment of the invention herein illustrated, each of the parts 10 or 11 to be connected is provided with a threaded bore or portion 15 and a smooth bore 16 of reduced diameter having an abrupt shoulder 17 adjacent one end thereof and a contact surface 18 adjacent the other end thereof and extending to the threaded portion 15. Instead of the rounded surface 18, the bore 16 may be of increasing diameter from the shoulder 17 to the threaded portion 15 to provide an extended contact surface for the deformed portion of the connector.

The connector indicated generally by the reference character 20 consists of a one-piece tubular member having a longitudinally extending passageway 21 therethrough and having an intermediate threaded portion 22 and reduced end portions 23. The threads 22 preferably have a ground lead-in at both ends; i.e., the first thread is not feathered. The connector 20, being of one piece, may be economically manufactured and, in practice, it is made of molded plastic so that the reduced ends 23 thereof may be deformed to form the seals yet to be referred to.

In assembling the connector with the part or parts to be connected, the threaded portion 22 thereof is engaged with the threaded portion 15 of the part to be connected and the reduced end portion 23 thereof is adapted to extend into the bore 16. As the part 10 or 11 and the connector 20 are relatively rotated, from the position shown in FIGURE 2 to that shown in FIGURE 1, the reduced end portion 23 enters the bore 16 until the free end of the end portion 23 engages the shoulder 17. This restricts further relative axial movement of the parts, as will be apparent. With the end of the reduced portion 23 engaging the shoulder 17, further relative rotative movement of the threaded portions 15 and 22 will create an axial pressure on the reduced end portion 23, thereby causing the end portion to be deformed and expanded radially outwardly to form an annular shoulder 24 in sealing engagement with the contact surface 18 of the part 10 or 11, thereby forming a fluid-tight seal therewith.

If the threaded portion 22 on the connector 20 is made with right-hand and left-hand threads, and corresponding threads are formed at the threaded portions 15 of the parts to be connected, both ends of the connector may be simultaneously deformed and expanded radially outwardly, as previously described, and thereby upset into sealing engagement with the contact surfaces 18 at both ends of the connector. It will be noted that while the seals at each end are independent of one another, they both may be formed simultaneously, as just described. However, if desired, the connector 20 may be threaded into one of the parts to be connected to form the seal at the shoulder 24 and the other part to be connected may be rotated relatively to the connector to upset the other end radially outwardly into sealing engagement with its contact surface 18.

The structure just described provides a quick and convenient means for connecting such items as pumps and meters; meters and manifolds; and any other parts requiring a fluid-tight connection provided with a positive liquid seal at either or both ends. By making the connector of molded plastic or similar material, it may be quickly and economically manufactured, and by making it in one piece, it may be easily handled and installed. Also, by making the connector of molded plastic, the reduced ends 23 are deformable, under axial pressure, so that they may be deformed and expanded radially outwardly into sealing engagement with the curved or rounded surfaces on the parts to be connected, to form a positive seal therewith.

As previously mentioned, the heretofore described structure may be embodied in, and the advantages obtained, in elbows, T's and the like. In FIGURES 3 and 4, this invention is shown embodied in elbow 30 having a central passage 31 therethrough. The elbow is provided with threaded portions 32 and reduced end portions 33. The threaded portions 32 are adapted to engage threaded portions 34 on the part to be connected which is also provided with a bore 35 having an abrupt shoulder 36 and a rounded or curved surface 37, similar to the previously described construction. In this form of construction, when additional axial pressure is applied to the parts by the threaded portions 32 and 34, the reduced end portion 33 is deformed and expanded radially outwardly to form an annular rib 38 which engages the curved or rounded surface 37 as in the previously described construction. Thus, it will be seen that the invention may be used with equal facility with an elbow and it may likewise be used with T's and the like.

While two commercially practical embodiments of the invention have been described and illustrated herein somewhat in details, it will be understood that various changes may be made as may come within the purview of the accompanying claims.

What is claimed is:

1. In a device of the class described, a part to be connected having a bore, and a threaded portion concentric therewith, said bore being provided with a radially inwardly extending shoulder adjacent the inner end and a contact surface adjacent the other end, and a connector formed of resiliently deformable material having a threaded portion adapted to engage the threaded portion of said part and an end portion having an axial length greater than the axial distance between said shoulder and said contact surface adapted to extend into said bore to engage said shoulder, whereby continued axial pressure on said connector causes said end portion to be expanded radially outwardly into sealing engagement with said contact surface to form a seal therebetween.

2. In a device of the class described, a part to be connected having a bore, and a threaded portion concentric therewith, said bore being provided with a radially inwardly extending shoulder adjacent the inner end and a contact surface adjacent the other end, and a connector formed of an elastomeric material having a threaded portion adapted to engage the threaded portion of said part and a reduced diameter end portion having an axial length greater than the axial distance between said shoulder and said contact surface adapted to extend into said bore to engage said shoulder, whereby continued axial pressure on said connector by said threads causes said reduced end portion to be upset radially outwardly into sealing engagement with said contact surface to form a seal therewith.

3. In a device of the class described, a part having a bore, and a threaded portion concentric therewith, said bore being provided with a radially inwardly extending abrupt shoulder adjacent the inner end and a curved surface adjacent the other end, and a connector formed of an elastomeric material having a threaded portion adapted to engage the threaded portion of said part and a deformable end portion having an axial length greater than the axial distance between said shoulder and said curved surface adapted to extend into said bore to engage said shoulder, whereby axial pressure on said connector by said threads causes said end portion to be deformed and expanded into sealing engagement with said curved surface to form a seal therewith.

4. In a device of the class described, a part having a bore, and a threaded portion concentric therewith, said bore being provided with a radially inwardly extending abrupt shoulder adjacent the inner end and a curved surface adjacent the other end, and a tubular connector formed of resiliently deformable material having a threaded portion adapted to engage the threaded portion of said part and a deformable end portion having an axial length greater than the axial distance between said shoulder and said curved surface adapted to extend into said bore to engage said shoulder to limit its axial movement, whereby axial pressure on said connector by said threads causes said end portion to be deformed and expanded into sealing engagement with said curved surface to form a seal therewith.

5. In a device of the class described, two parts to be connected each having a threaded portion and a bore of reduced diameter provided with a radially inwardly extending shoulder adjacent one end and a rounded surface adjacent the other end, and a connector formed of an elastomeric material having a threaded portion intermediate its ends adapted to engage the threaded portions of said parts and end portions of reduced diameters, each having an axial length greater than the axial distance between said shoulder and rounded surface adapted to extend into said bores to engage the shoulders therein to limit relative axial movement of the connector, whereby axial pressure on said connector by said threaded portions causes said end portions to be deformed and expanded radially outwardly into sealing engagement with said rounded surfaces to form seals therewith.

6. In a device of the class described, a part having a bore, and a threaded portion concentric therewith, said bore being provided with a shoulder adjacent the inner end thereof and a curved surface adjacent the other end thereof, and an elbow-shaped tubular connector formed of an elastomeric material having a threaded portion adapted to engage the threaded portion of said part and a deformable end portion of reduced diameter adapted to extend into said bore to engage said shoulder to limit further axial movement thereof, said end portion having an axial length greater than the axial length of said bore whereby axial pressure on said connector by relatively rotating said threaded portions causes said end portion to be deformed and expanded radially outwardly into sealing engagement with said curved surface to form a seal therewith.

7. A device as described in claim 1 in which said connector is in the form of a tube and is shaped to form an elbow.

8. A device as described in claim 5 in which said connector is tubular and shaped to form an elbow.

References Cited by the Examiner

UNITED STATES PATENTS

| | | | |
|---|---|---|---|
| 2,306,702 | 12/42 | Koerner | 285—226 |
| 2,755,110 | 7/56 | Jacobs | 285—423 X |
| 3,104,899 | 9/63 | McKenzie | 285—423 X |
| 3,108,827 | 10/63 | Mason | 285—423 X |
| 3,145,035 | 8/64 | Hanback | 285—110 |

FOREIGN PATENTS 1,123,385  6/56  France.

CARL W. TOMLIN, *Primary Examiner.*